(12) United States Patent
Savatsky et al.

(10) Patent No.: US 8,124,696 B2
(45) Date of Patent: Feb. 28, 2012

(54) METHOD OF USING AN UPPER DISCHARGE IN A FLUIDIZED BED REACTOR AND SYSTEM THEREOF

(75) Inventors: Bruce J. Savatsky, Kingwood, TX (US); R. Eric Pequeno, Baytown, TX (US); Larry L. Hjelle, Dayton, TX (US)

(73) Assignee: Univation Technologies, LLC, Houston, TX (US)

( * ) Notice: Subject to any disclaimer, the term of this patent is extended or adjusted under 35 U.S.C. 154(b) by 235 days.

(21) Appl. No.: 12/623,060

(22) Filed: Nov. 20, 2009

(65) Prior Publication Data

US 2011/0124826 A1 May 26, 2011

(51) Int. Cl.
*C08F 2/00* (2006.01)
*C08F 210/00* (2006.01)
*G05D 7/00* (2006.01)

(52) U.S. Cl. ............................ 526/59; 526/348; 422/110
(58) Field of Classification Search .................... 526/59, 526/348; 422/110
See application file for complete search history.

(56) References Cited

U.S. PATENT DOCUMENTS

| | | | |
|---|---|---|---|
| 4,336,227 A | 6/1982 | Koyama et al. | 422/111 |
| 4,621,952 A | 11/1986 | Aronson | 406/138 |
| 4,855,370 A | 8/1989 | Chirillo et al. | 526/74 |
| 5,382,638 A | 1/1995 | Bontemps et al. | 526/67 |
| 5,428,118 A | 6/1995 | Painter et al. | 526/74 |
| 5,545,378 A | 8/1996 | Morterol et al. | 422/132 |
| 5,602,067 A | 2/1997 | Nowlin et al. | 502/104 |
| 5,688,865 A | 11/1997 | Ali et al. | 525/53 |
| 5,969,061 A | 10/1999 | Wonders et al. | 526/68 |
| 6,455,644 B1 | 9/2002 | Olson et al. | 526/67 |
| 6,460,412 B1 | 10/2002 | Cai et al. | 73/290 |
| 6,472,483 B1 * | 10/2002 | Goode et al. | 526/88 |
| 6,498,220 B2 | 12/2002 | Hartley et al. | 526/88 |
| 6,759,489 B1 | 7/2004 | Turkistani | 526/68 |
| 6,897,268 B2 | 5/2005 | Yamamoto et al. | 526/61 |
| 6,905,654 B2 | 6/2005 | Bartilucci et al. | |
| 2001/0024625 A1 | 9/2001 | Olson et al. | 422/139 |
| 2005/0008599 A1 | 1/2005 | Lu et al. | |
| 2007/0003450 A1 | 1/2007 | Burdett et al. | 422/108 |
| 2007/0004879 A1 | 1/2007 | Penzo et al. | 526/88 |
| 2007/0244271 A1 | 10/2007 | Muhle et al. | 526/60 |

* cited by examiner

*Primary Examiner* — William Cheung

(57) ABSTRACT

A method according to one embodiment includes operating a reactor or providing a reactor after operation, wherein the reactor includes a bottom section, a bed section above the bottom section, a distributor plate between the bottom section and the bed section, an expanded section above the bed section, and an upper section above the bed section, wherein the bed section has a height H measured from the distributor plate to the expanded section; measuring a concentration of particulates in the upper section of the reactor to obtain a first determined level of particulates in the upper section; and discharging at least some of the particulates from the reactor at an upper discharge point located above 0.55H as measured vertically from the distributor plate based on the first determined level. Additional systems and methods are also provided.

17 Claims, 4 Drawing Sheets

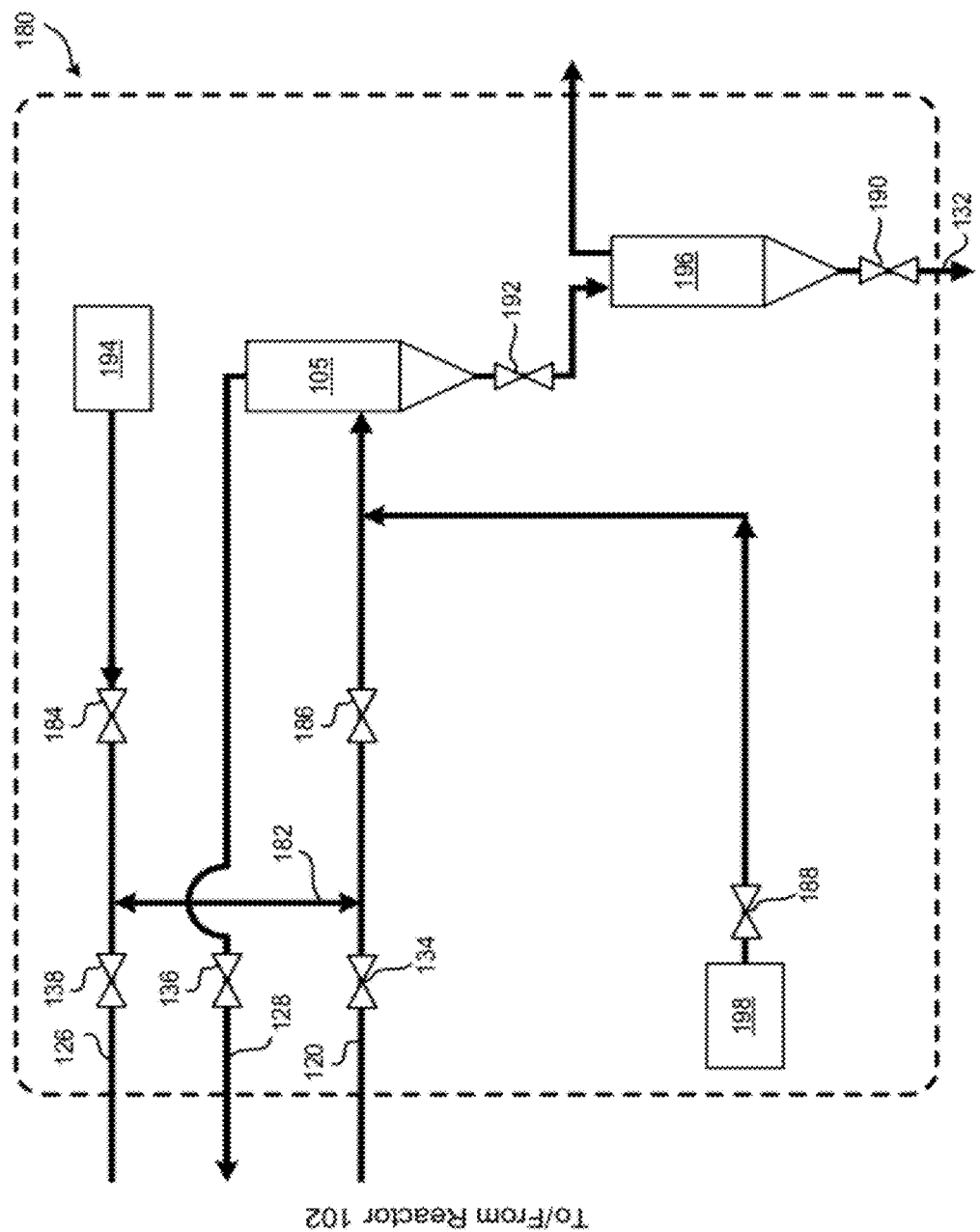

US 8,124,696 B2

METHOD OF USING AN UPPER DISCHARGE IN A FLUIDIZED BED REACTOR AND SYSTEM THEREOF

CROSS REFERENCE TO RELATED APPLICATIONS

This application claims the benefit of U.S. provisional application Ser. No. 61/200,807, filed Dec. 4, 2008, the disclosure of which is incorporated by reference in its entirety.

FIELD OF THE INVENTION

The present invention relates to polymerization reactions, and more particularly, this invention relates to systems and methods for reducing fouling in fluidized bed polyolefin polymerization reactor systems.

BACKGROUND

In the gas phase process for production of polyolefins such as polyethylene, a gaseous alkene (e.g., ethylene), hydrogen, co-monomer(s) and other raw materials are converted to solid polyolefin product. Generally, gas phase reactors include a fluidized bed reactor, a compressor, and a cooler (heat exchanger). The reaction is maintained in a two-phase fluidized bed of granular polyethylene and gaseous reactants by the fluidizing gas which is passed through a distributor plate near the bottom of the reactor vessel. The reactor vessel is normally constructed of carbon steel and rated for operation at pressures up to about 31 bars (or about 3.1 MPa). Catalyst is injected into the fluidized bed. Heat of reaction is transferred to the circulating gas stream. This gas stream is compressed and cooled in the external cycle line and then is reintroduced into the bottom of the reactor where it passes through a distributor plate. Make-up feedstreams are added to maintain the desired reactant concentrations.

Operation of most reactor systems is critically dependent upon good mixing for uniform reactor conditions, heat removal, and effective catalyst performance. The process must be controllable, and capable of a high production rate. In general, the higher the operating temperature, the greater the capability to achieve high production rate. However, as the operating temperature approaches and exceeds the melting point of the polyolefin product, the particles of polyolefin become tacky and melt. This may cause sheeting in the reactor bed, but also may cause problems in the cycle line.

Typically, the cycle line pulls the gas stream from the upper portion of the reactor bed. Near this region, there has been found to be an accumulation of polymer fines (very fine particles of polymer, e.g., less than 125 US mesh), which then get passed through the cycle line. An interplay of forces results in particles agglomerating with adjacent particles, both in the reactor bed and in the cycle line, which causes sticking together of particles and accumulation of resin in the cycle system and its components such as the cooler. As the cooler becomes more fouled, it results in a progressively decreasing cooling efficiency, which can eventually lead to elevated operating temperatures and failure of the process due to inability to properly cool the reaction. To clear the fouling, the system is shut down. This reactor shut down leads to increased costs associated with the cleaning and with lost production time due to the shut down.

In one specific example of this problem, when only bottom discharge is used from a reactor, polymer fines may be allowed to build up around a cycle gas valve, pipe walls, or cooler in the cycle gas system, which can constrict flow to the point where the entire system may be shutdown to prevent extensive damage. As this occurs, there may also be increases in the cycle cooler and distributor plate pressure drops, and the cycle gas valve and cycle gas compressor may hunt for a set point in which they can create a condition which allows the desired flow through the cycle system, which also results in inefficiencies. In some instances, the amount of build up of particles in the cycle gas system may constrict flow to a point where not enough gas flow can be achieved through the cycle gas system to maintain superficial gas velocity, and this may warrant shutdown of the entire system.

Background references include U.S. Pat. Nos. 5,382,638, 5,428,118, and 5,545,378.

Accordingly, it would be desirable to minimize the presence of particles, for example, that may accumulate in the cycle line, particularly near the cooler, while maximizing production rates.

SUMMARY

The present invention is broadly directed to various methods and systems for reducing cycle system fouling. In certain embodiments, the methods are performed in conjunction with a polymerization reactor system such as gas-phase reactor system. The invention is also broadly directed to various systems in which fouling may occur.

A method according to one embodiment includes operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; measuring a concentration of particulates in the upper section of the reactor to obtain a first determined level of particulates in the upper section; and discharging at least some of the particulates from the reactor at an upper discharge point located above 0.55H as measured vertically from the distributor plate based on the first determined level.

A method according to another embodiment includes operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; discharging at least some of the particulates from the reactor at an upper discharge point located above 0.55H as measured vertically from the distributor plate; and discharging particulates from the reactor at a lower discharge point located below the upper discharge point, wherein the particulates are discharged from the upper and lower discharge points in a discharge cycle, wherein the particulates are discharged from the upper discharge point before the particulates are discharged from the lower discharge point during the discharge cycle.

A method according to yet another embodiment includes operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; discharging at least some of the particulates from the reactor at an upper discharge point located above 0.55H as measured vertically from the distributor plate; and discharging particulates from the reactor at a lower discharge point located below the upper discharge point, with the proviso that no particulate separation mechanism is present in a cycle gas stream coupled to the reactor.

A method for polymerizing polyolefin polymers according to one embodiment includes operating a reactor, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; contacting at least one catalyst with one or more monomers under polymerizable conditions to produce the polyolefin polymers; measuring a concentration of particulates in the upper section of the reactor to obtain a first determined level of particulates in the upper section; and discharging at least some of the particulates from the reactor at an upper discharge point located above 0.55H as measured vertically from the distributor plate based on the first determined level.

A system according to one embodiment includes a reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; a control system for measuring a concentration of particulates in the upper section of the reactor to obtain a first determined level of particulates in the upper section, and discharging at least some of the particulates from the reactor at an upper discharge point located above 0.55H as measured vertically from the distributor plate based on the first determined level.

A system according to another embodiment includes a reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; a control system for discharging at least some of the particulates from the reactor at an upper discharge point located above 0.55H as measured vertically from the distributor plate, and discharging particulates from the reactor at a lower discharge point located below the upper discharge point, wherein the particulates are discharged from the upper and lower discharge points in a discharge cycle, wherein the particulates are discharged from the upper discharge point before the particulates are discharged from the lower discharge point during the discharge cycle.

A system in a further embodiment includes a reactor comprises a bottom section, a bed section above the bottom section, a distributor plate between the bottom section and the bed section, an expanded section above the bed section, and an upper section above the bed section, wherein the bed section has a height H measured from the distributor plate to the expanded section; a control system for discharging at least some of the particulates from the reactor at an upper discharge point located above 0.55H as measured vertically from the distributor plate, and discharging particulates from the reactor at a lower discharge point located below the upper discharge point, with the proviso that no particulate separation mechanism is present in a cycle gas stream coupled to the reactor.

BRIEF DESCRIPTION OF THE DRAWINGS

FIG. 4 is a detailed view of a separation system taken from FIG. 1.

DETAILED DESCRIPTION

Figure 1:
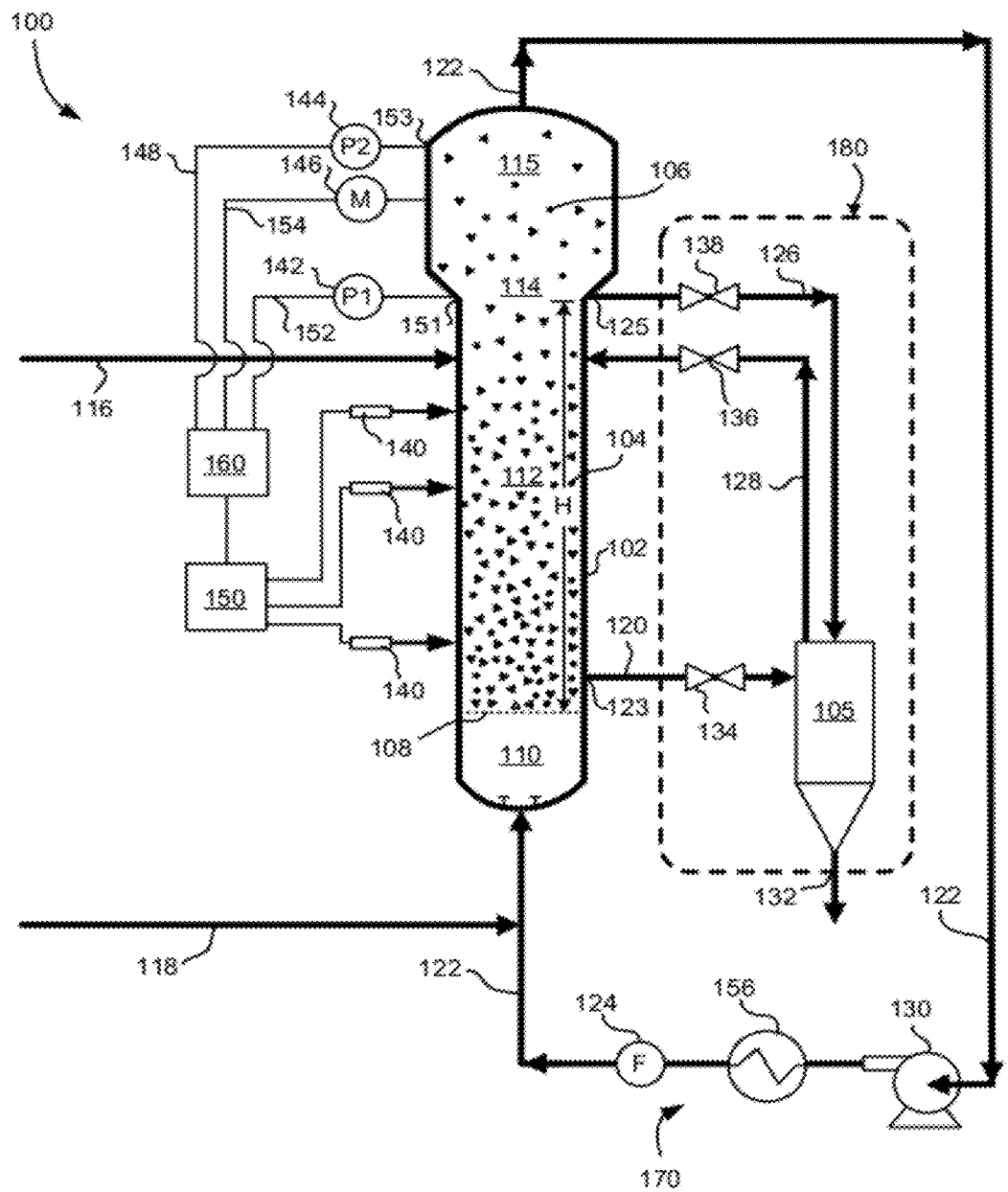
FIG. 1 is a schematic representation of the general methods, systems and/or apparatus of certain embodiments of the invention illustrating implementation in a fluidized bed polymerization reactor system.

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

In one general embodiment, a method comprises operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section. In addition, the method comprises measuring a concentration of particulates in the upper section of the reactor to obtain a first determined level of particulates in the upper section and discharging at least some of the particulates from the reactor at an upper discharge point located above 0.55*H as measured vertically from the distributor plate based on the first determined level.

In another general embodiment, a method comprises operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section. The method also includes discharging at least some of the particulates from the reactor at an upper discharge point located above 0.55*H as measured vertically from the distributor plate, and discharging particulates from the reactor at a lower discharge point located below the upper discharge point, wherein the particulates are discharged from the upper and lower discharge points in a discharge cycle, wherein the particulates are discharged from the upper discharge point before the particulates are discharged from the lower discharge point during the discharge cycle.

In another general embodiment, a method comprises operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section. The method further comprises discharging at least some of the particulates from the reactor at an upper discharge point located above 0.55*H as measured vertically from the distributor plate, and discharging particulates from the reactor at a lower discharge point located below the upper discharge point, with the proviso that no particulate separation mechanism is present in a cycle gas stream coupled to the reactor.

In another general embodiment, a method for polymerizing polyolefin polymers comprises operating a reactor, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section. Also, the method includes contacting at least one catalyst with one or more monomers under polymerizable conditions to produce the polyolefin polymers and measuring a concentration of particulates in the upper section of the reactor to obtain a first determined level of particulates in the upper section. The method further comprises discharging at least some of the particulates from the reactor at an upper discharge point located above 0.55*H as measured vertically from the distributor plate based on the first determined level.

In yet another embodiment, a system comprises a reactor comprising a bottom section, a bed section above the bottom section, a distributor plate between the bottom section and the bed section, an expanded section above the bed section, and an upper section above the bed section, wherein the bed section has a height H measured from the distributor plate to the expanded section. In addition, the system includes a control system for measuring a concentration of particulates in the upper section of the reactor to obtain a first determined level of particulates in the upper section, and discharging at least some of the particulates from the reactor at an upper discharge point located above 0.55*H as measured vertically from the distributor plate based on the first determined level.

In another general embodiment, a system comprises a reactor comprising a bottom section, a bed section above the bottom section, a distributor plate between the bottom section and the bed section, an expanded section above the bed section, and an upper section above the bed section, wherein the bed section has a height H measured from the distributor plate to the expanded section. Also, the system includes a control system for discharging at least some of the particulates from the reactor at an upper discharge point located above 0.55*H as measured vertically from the distributor plate, and discharging particulates from the reactor at a lower discharge point located below the upper discharge point, wherein the particulates are discharged from the upper and lower discharge points in a discharge cycle, wherein the particulates are discharged from the upper discharge point before the particulates are discharged from the lower discharge point during the discharge cycle.

In yet another general embodiment, a system comprises a reactor comprising a bottom section, a bed section above the bottom section, a distributor plate between the bottom section and the bed section, an expanded section above the bed section, and an upper section above the bed section, wherein the bed section has a height H measured from the distributor plate to the expanded section. In addition, the system includes a control system for discharging at least some of the particulates from the reactor at an upper discharge point located above 0.55*H as measured vertically from the distributor plate, and discharging particulates from the reactor at a lower discharge point located below the upper discharge point, with the proviso that no particulate separation mechanism is present in a cycle gas stream coupled to the reactor.

It has been found that by reducing the amount of polymer particles in the cycle system, the amount of agglomeration of particles in the cycle system, particularly near the cooler, can be greatly reduced. Because of normal fluidization segregation and elutriation phenomena, smaller polymer particles (polymer fines) tend to be in higher concentration near the upper portion of the reactor bed than in the lower portion of the reactor bed.

Typically, only bottom section product discharge that is located near the lower section of the reactor bed and above the distributor plate is used to remove polymer product from the reactor bed. The discharge polymer may then be purged and typically is sent to downstream product compounding. However, typically, an upper reactor bed discharge is not used to remove polymer product.

Since the gas stream used in the cycle system is pulled from the upper portion of the reactor bed, without the use of a special upper bed discharge, the smaller particles tend to elutriate and are entrained from the reactor bed by well known fluidization mechanisms. The entrained fines can create problems elsewhere in the fluidization reactor system including for example: build-up and fouling in the cycle gas piping, cycle gas cooler, cycle gas valves, reactor distributor plate by either particle deposition on the surfaces and/or combined with continued polymerization in these relatively stagnant zones. Eventually, with time, these fouling events may lead to cycle gas flow reduction and may require a reactor shut-down to mechanically clean the system. This reactor shut-down leads to increased costs associated with the cleaning and with lost production time due to the shut-down.

Although it may appear that removing such a small quantity of gas from the reactor (e.g., about 100 lb/hr or less for a pilot plant reactor system) compared to the total gas in the system (e.g., about 26,000 lb/hr total for a pilot plant system) could not possibly cause improvements in the performance of the system, if that small amount of gas is taken off in the region of the upper bed discharge, it is possible to remove enough fines to prevent the plugging problems discussed above. The amount of gas taken from the upper portion of the reactor in this example is generally about 0.4% of the total gas in the system.

This solution works, however, because in the upper section of the reactor, above the bed, there probably exists a cloud of fine particles. If gas is taken from this cloud through an outlet in this region, an improvement has been seen in reducing the plugging events in the cycle gas system. The upper zone of the reactor probably contains a cloud of fine particles. If some of material from this cloud is not removed, then eventually the amount of fines in the cloud will reach a situation where fines are being entrained into the cycle gas line (by elutriation and entrainment mechanisms that are discussed herein and known in the art).

To address these problems, several techniques may be used as known by one of ordinary skill in the relevant art, such as: increasing the diameter and/or height of the upper reactor dome to reduce gas velocity and the particle entrainment; addition of a cyclone particle separator in the reactor off-gas; modification of the catalyst properties to produce a lower amount of small particles (fines); modification of the catalyst kinetics to reduce the half life to essentially reduce the catalysts' activity quickly enough to prevent continued polymerization in the cycle system; and/or addition of special additives or poisons to render inactive the entrained catalysts to prevent continued polymerization in the cycle system.

However, the use of an upper reactor bed discharge has added benefits over these techniques in that it provides a low cost and easy methodology to eliminate the problems associated with cycle system fouling and entrained particle fines, as well as providing a simpler and lower cost option than the methods disclosed above.

While the present invention is applicable to gas phase polyolefin production, the broad concepts and teachings herein may also have applicability to many types of processes, including but not limited to, gas phase, gas/solid phase, liquid/solid phase, gas/liquid phase, and gas/liquid/solid phase reactor systems including polymerization reactor systems.

For ease of understanding of the reader, as well as to place the various embodiments of the invention in a context, much of the following description shall be presented in terms of a commercial, gas phase polyethylene reactor system. It should be kept in mind that this is done by way of non-limiting example only.

A general method of the invention can be described according to one embodiment, with reference to FIG. 1, in which a bulk material may be present in a fluidized bed polymerization reactor system 100. Such bulk material can be gaseous, liquid and/or solid material. In a reactor system 100, illustrative bulk materials may include one or more reaction raw materials such as feedstocks, reaction products such as polymer particles, reaction adjuncts such as catalysts, reaction byproducts, etc., and other materials. Thus, the bulk material may include substantially pure individual materials as well as combinations of materials, the material(s) being present in one or more phases. An optimum operating temperature for producing a polyolefin in the fluidized bed reactor system 100 may be selected.

A chromium oxide-based catalyst that has been reduced may be selected based on one or more desired properties of the polyolefin achieved at the selected operating temperature. A monomer may be contacted with the catalyst in the fluidized bed reactor system 100. A cycle stream in a cycle line 122 of the fluidized bed reactor system 100 may be cooled in order to maintain the optimum operating temperature. Oxygen may be fed to the fluidized bed reactor system 100 via one or more oxygen feed lines 140 to maintain in the fluidized bed reactor system 100 about a minimum effective amount of oxygen that minimizes fouling of the fluidized bed reactor system 100. Fouling can be considered to be minimized if the reactor system 100 can operate at least about 3 months without requiring opening of the reactor system 100 for cleaning. In preferred embodiments, fouling may be considered minimized if the reactor system 100 can operate 6 months, 9 months, 1 year or 2 years without requiring opening of the reactor system 100 for cleaning.

The oxygen feed rate may be controlled through a gas controller 150, which may also be connected to another control system 160. The gas controller 150 may control the flow rate, gas composition (percent oxygen), temperature, etc., of the oxygen stream to be added to the reactor system 100.

In some embodiments, the fluidized bed reactor system 100 may include a bottom section 110, a bed section 112 above the bottom section 110, a distributor plate 108 between the bottom section 110 and the bed section 112, an expanded section 114 above the bed section 112, and an upper section 115 above the bed section 112. The bed section 112 may be measured from the distributor plate 108 to the expanded section 114, resulting in a height H.

In addition, in some embodiments, the system 100 may include a control system 160 for measuring a concentration of particulates, possibly including polymer fines 106 in the upper section 115 of the reactor 102 to obtain a first determined level of particulates. Also, the control system 160 may be used to cause a discharge of at least some of the particulates from the reactor 102 at an upper discharge point 125 located above 0.55 times H, as measured vertically from the distributor plate 108 based on the first determined level (e.g., if the first determined level is above a threshold value). Polymer fines 106 tend to migrate to the upper portion 115 of the fluidized bed reactor 102. Accordingly, to minimize fouling in the cycle gas system 170 and maximize production from the system 100, it is desirable to maximize extraction of particulates, especially polymer fines 106, from the upper portion 115 of the fluidized bed reactor 102.

The control system 160 may discharge at least some of the particulates from the upper section 115 of the reactor 102 by causing the upper discharge valve 138 to open, which allows particulates to enter into the upper discharge line 126, which may be directed toward a separation system 180 which may include any known type of separator and/or any other intermediary or finishing processing equipment used in polymer production, such as a purge bin 105, etc. In some embodiments, a pressure differential from the reactor 102 to the separation system 180 (higher pressure in the reactor 102 versus lower pressure in the separation system 180) may cause the flow of particulates through the upper discharge line 126, but any technique or method may be used to create the flow, such as using a pump, gravity, etc., may be used to force the flow of particulates from the upper section 115 of the reactor 102.

According to some embodiments, a polymer product may exit from the separation system 180 or other intermediary or finishing processing equipment through product discharge line 132, which may direct the flow toward more equipment or processing.

In some embodiments, the system 100 may further include a lower discharge point 123 located below the upper discharge point 125. The control system 160 may discharge at least some of the particulates, such as polymer particulates 104, from the reactor 102 at the lower discharge point 123. The particulates may be discharged from the upper discharge point 125 and lower discharge point 123 in a discharge cycle, wherein the particulates are discharged from the upper discharge point 125 before the particulates are discharged from the lower discharge point 123 during the discharge cycle. In alternative embodiments, the particulates may be discharged from the lower discharge point 123 prior to particulates being discharged from the upper discharge point 125 during the discharge cycle.

The control system 160 may cause the discharge of particulates from the lower discharge point 123 of the reactor 102 by causing the lower discharge valve 134 to open, which allows particulates to enter into the lower discharge line 120, which may be directed toward a separation system 180 or any other intermediary or finishing processing equipment used in polymer production. The same principles discussed above in relation to the upper discharge line 126 may apply to causing the particulates to enter the lower discharge line 120.

In some further embodiments, the control system 160 may be electrically connected to at least some of the valves and/or instruments in the reactor system 100, such that the control system 160 may receive, manipulate, calculate, output, etc., electrical signals, pneumatic signals, information, data, etc., so that the control system 160 may control units of the system 100.

In some embodiments, a return line 128 may return particulates from the separation system 180 to the reactor 102, possibly at a location in the bed section 112 of the reactor 102, preferably below the upper discharge point 125. The return line 128 may also be used to equilibrate pressures in the separation system 180 as particulates are being added to the separation system 180, possibly by having the control system 160 cause the return valve 136 to open, allowing flow through the return line 128.

With continued reference to FIG. 1, methods may be described according to several embodiments. The methods described below may be used in conjunction with the equipment and processing shown in the fluidized bed reactor system 100 in FIG. 1, or in any desired environment. Therefore, FIG. 1 is not limiting on the methods in any way, and is used for exemplary purposes only.

In one method according to a preferred embodiment, a reactor 102 (for purposes of clarity and simplicity, reactor system 100 will be used for this and other descriptions of methods disclosed herein) may be operated or a reactor 102 may be provided after operation, wherein the reactor 102 may comprise a bottom section 110, a bed section 112 above the bottom section 110, a distributor plate 108 between the bottom section 110 and the bed section 112, an expanded section 114 above the bed section 112, and an upper section 115 above the bed section 112. The bed section 112 may be measured from the distributor plate 108 to the expanded section 114, resulting in a height H.

The method may include measuring a concentration of particulates, possibly including particles of polymers, polymer fines 106, etc., in the upper section 115 of the reactor 102 to obtain a first determined level of particulates in the upper section 115 according to some embodiments. In some embodiments, the polymer particulates may include poly(alpha)olefin polymers.

In some further embodiments, the first determined level may be measured by using a pressure differential between two vertically spaced points in the upper section 115, such as measuring points 151 and 153. Each measuring point 151 and 153 may have a pressure tap, gauge or transmitter (P1 142 and P2 144) in line to transmit the pressure measured at each point 151 and 153 to the control system 160, such that the control system 160 may interpret the pressure differential and calculate the first determined level. The control system may be connected to the pressure transmitters 142 and 144 through electrical connections 152 and 148, respectively. In addition, the pressure transmitters may send any other type of signal, such as pneumatic, wireless, etc. Any other method of determining the first determined level may also be used, such as a standalone differential pressure transmitter, pressure transducers, etc.

In another embodiment, the first determined level may be determined by using a pressure differential between the upper section 115 and the bed section 112. In an alternative approach, the first determined level may be determined by using a pressure differential between the upper section 115 and the expanded 115. Preferably, the pressure is measured at or near the top of the upper section, such as at measuring point 153, but could be measured at any other point below the top of the expanded section 115.

In yet another embodiment, the first determined level may be determined by using a plot of the percent of fines versus a pressure in the upper section 115. For example, a plot may be created by measuring the percent of fines 106 through use of an ultrasonic probe, radar probe, or any other measuring device capable of determining the percent of polymer fines 106 versus other materials and gases in the upper section 115.

In another approach, the first determined level may be determined through the use of a static meter, such as the entrainment static meter 146, which may be connected electrically or otherwise to the control system 160 through connection 154. A conventional static meter 146 may be used.

According to additional embodiments, the method may include discharging at least some of the particulates, possibly including polymer fines 106, from the reactor 102 at an upper discharge point 125 located above 0.55 times H as measured vertically from the distributor plate 108. The discharge may be based on the first determined level, e.g., if the first determined level is above a threshold value. Polymer fines 106 tend to migrate to the upper portion 115 of the fluidized bed reactor 102. Accordingly, to minimize fouling in the cycle gas system 170 and maximize production from the system 100, it is desirable to maximize extraction of particulates, especially polymer fines 106, from the upper portion 115 of the fluidized bed reactor 102.

In another approach, at least some of the particulates may be discharged from the reactor 102 at a point above about 0.60 times H, alternatively at a point above about 0.70 times H, alternatively at a point above about 0.80 times H, alternatively at a point above about 0.90 times H, etc.

In some embodiments, at least some of the particulates may be discharged from a point located in the expanded section 114. In further embodiments, one or more discharge points may be located anywhere in the upper section 115 and expanded section 114.

In some embodiments, particulates may be discharged from the reactor 102 at a lower discharge point 123 located below the upper discharge point 125. The particulates, possibly including polymer particulates 104, may be discharged from the upper discharge point 125 and the lower discharge point 123 in a discharge cycle, wherein the particulates are discharged from the upper discharge point 125 before the particulates are discharged from the lower discharge point 123 during the discharge cycle. In alternative embodiments, the particulates may be discharged from the lower discharge point 123 prior to particulates being discharged from the upper discharge point 125 during the discharge cycle.

According to some embodiments, a discharge apparatus at the upper discharge point 125 may also function as a pressure tap during the discharging at the lower discharge point 123. Conversely, a discharge apparatus at the lower discharge point 123 may also function as a pressure tap during the discharging at the upper discharge point 125.

In some embodiments, a return line 128 may return particulates from the separation system 180 to the reactor 102, possibly at a location in the bed section 112 of the reactor 102, preferably below the upper discharge point 125. The return line 128 may also be used to equilibrate pressures in the separation system 180 as particulates are being added to the separation system 180, possibly by having the control system 160 cause the return valve 136 to open, allowing flow through the return line 128.

In some embodiments, the method may be used without the benefit of a particulate separation mechanism, such as a cyclone, screen, filter, etc., being present in the cycle gas system 170.

According to some embodiments, during a polymerization process, at least one catalyst may be contacted with one or more monomers under polymerizable conditions to produce the polyolefin polymers. Monomers may be added to the reactor 102 through addition line 116. Further, in some embodiments, a make-up line 118 may be used to add any additional components that may aid in the efficiency and normal operation of the process.

Further details of fluidized bed polymerization reactor systems including an illustrative system for calculating pressure differentials are described in detail in U.S. Pat. No. 5,688,865, which is hereby incorporated by reference to the extent that definitions therein do not conflict with the stated or implied definitions presented herein. Also, further details of fluidized bed polymerization reactor systems including methods and systems for product discharge and separation are described in detail in U.S. Pat. No. 6,472,483, which is hereby incorporated by reference to the extent that definitions therein do not conflict with the stated or implied definitions presented herein. However, any system used in conjunction with the production of polymer product may be used in conjunction with the embodiments of the invention as disclosed herein, and the invention is not limited in scope or application in any manner by the details of the patents referenced herein.

Additional details about an illustrative pressure tap system for monitoring the pressure in the reactor bed may be found in U.S. Pat. No. 4,621,952, which is hereby incorporated by reference to the extent that definitions therein do not conflict with the stated or implied definitions presented herein. However, any pressure monitoring system, including pressure taps, may be used to monitor the pressure in the reactor bed, and the invention is not limited in any manner by the details of the patents referenced herein.

Fouling

Fouling in a reactor system such as that shown in FIG. 1 is problematic for several reasons. Fouling of the cooler 156 (heat exchanger) causes reduced cooling efficiency. Fouling of sensors, such as 144, 146, etc., employed to measure temperature, pressure, flow rate, etc. interferes with sensor operations. Fouling at the distributor plate 108 affects the formation and maintenance of the fluidized bed.

Fouling is particularly problematic at the cooler 156, which is responsible for maintaining the operating temperature. If the cooler 156 becomes fouled, it becomes less efficient, sometimes requiring a slowing of the production rate to lower heat generation in the reactor 102. If the fouling is severe, the cooler 156 may fail to adequately cool the materials flowing through it and may allow the temperatures in the system 100 to surpass the melting point of the polymer product. If the temperature surpasses the melting point of the polymer product, referred to as "resin," the resin becomes tacky and forms agglomerates, sheeting, and additional fouling. Agglomerates adversely affect the fluidized bed by disrupting flow. Sheeting along the reactor 102 wall may collapse and cause the bed to collapse, requiring a costly shutdown of the reactor system 100.

Fouling in shell and tube heat exchangers on the plate or "tube sheet" at the inlet to the tube array, as well as accumulations in the tubes have been observed in a fluidized bed reactor system producing polyethylene with a chromium oxide-based catalyst that has been reduced.

To avoid the agglomeration of polymer fines and particulates in the cycle gas system 170 and especially the cooler 156, the gas pulled from the upper section 115 of the reactor 102 should have a substantial amount of polymer fines 106 removed prior to injection into the cycle line 122. Prior to pulling gas from the upper section 115, the upper discharge valve 138 may be opened, thus removing some of the particulates from the reactor 102 before injection of gas into the cycle line 122. That way, as the pump 130 pulls the gas from the upper section 115 of the reactor 102, it will have less particulates entrained, and agglomeration of the polymer can be reduced in the cycle system 170.

Fluids

In general, for example, the reactor systems and methods described herein can be used in connection with liquids and/or gases having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.1 $g/cm^3$ to about 20 $g/cm^3$ and/or can have a dielectric constant ranging from about 1 to about 100. In many embodiments of the invention, the bulk material is a gaseous fluid. Gaseous fluids can, for example, generally have viscosities ranging from about 0.001 to about 0.1 cP, and/or can have densities ranging from about 0.0005 to about 0.1 $g/cm^3$ and/or can have a dielectric constant ranging from about 1 to about 1.1.

The bulk material can include relatively pure gaseous elements (e.g., gaseous $N_2$ gaseous $C_2$). Other components can include relatively pure liquid, solid, or gaseous compounds (e.g., liquid or solid catalyst, gaseous monomer, air). The various systems of the inventions can also include single-phase or multi-phase mixtures of gases, solids and/or liquids, including for example: two-phase mixtures of solids and gases (e.g., fluidized bed systems), mixtures of gases with a single type of particle, mixtures of gases with different types of particles (e.g., polymer and catalyst particles); and/or three-phase mixtures of gases, liquids and solids (e.g., fluidized bed with liquid catalyst being added).

Catalysts

Any type of catalyst or catalyst system may be used in embodiments of the present invention.

If the catalyst requires the use of one or more co-catalysts, as is usually the case, the one or more cocatalysts may be introduced separately into the reaction zone where they will react with the catalyst to form the catalytically active reaction product. However the catalyst and cocatalyst(s) may be mixed prior to their introduction into the reaction zone.

The catalysts and catalyst systems useable in various aspects of the present invention include chromium oxide-based catalysts. For example, ethylene polymers having broad molecular weight distributions can be obtained by use of a chromium oxide-based catalyst obtained by calcining a chromium compound carried on an inorganic oxide carrier in a non-reducing atmosphere to activate it such that at least a portion of the carried chromium atoms is converted to hexavalent chromium atoms ($Cr^{+6}$). This catalyst is commonly referred to in the art as the Phillips catalyst. The chromium compound is impregnated onto silica, fluidized and heated in the presence of oxygen to about 400° C.-860° C., converting chromium to the $^{+6}$ oxidation state. Chromium oxide catalysts possess adequate productivity and activity, yet polyethylenes produced through their use are less than optimal for a number of applications where higher molecular weight, broader molecular weight distribution, or the presence of some degree of bimodality of molecular weight distribution is desired.

Catalysts impregnated with bis-triphenyl silyl chromate on silica (SC catalysts) are one type of inorganic oxide-supported Cr catalyst that produces polyethylene not having the aforementioned deficiencies. SC-type catalysts are typically reduced with aluminum alkyl-type compounds, such as DEALE, during a catalyst preparation step prior to addition to the reactor. Such catalysts produce polyethylene with desirable broader molecular weight distribution. Chromium oxide-on-silica catalysts reduced with aluminum alkyl-type compounds such as DEALE represent one pathway to improved catalyst systems for polyethylene having characteristics of those typically formed using silylchromate-on-silica catalysts.

A chromium oxide-based catalyst reduced with such a reducing agent will have certain properties based on the molar ratio of reducing agent to chromium.

Information about these and other types of catalysts as well as characteristics of the polymer products formed is found in U.S. Pat. No. 6,989,344, which is herein fully incorporated by reference to the extent that definitions therein do not conflict with the stated or implied definitions presented herein.

Metallocene catalysts may be used in various embodiments. XCAT™ HP-100, EZ-100, VP-100 are illustrative metallocene catalysts available from UNIVATION TECHNOLOGIES having a sales office at Houston, Tex., 77056.

The catalyst composition may comprise a catalyst component, which is (or includes) a non-metallocene compound. In an embodiment, the catalyst component comprises a Ziegler-Natta catalyst compound, such as disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used in embodiments of the present invention include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3 AlCl_3$ and $Ti(OC_{12}H_{25})Cl_3$.

Conventional-type transition metal catalyst compounds based on magnesium/titanium electron-donor complexes that are useful in embodiments of the invention are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type $M^3M^4_v X^2_c R^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Additional catalyst compounds which may be utilized in the catalyst compositions of the invention include invention include: Group 15 atom and metal containing compounds; metallocene compounds; phenoxide catalyst compounds; additionally discovered catalyst compounds; and conventional-type transition metal catalysts. Several suitable catalysts and methods for preparing catalysts are described in U.S. Pat. No. 6,846,886, which is herein incorporated by reference to the extent that definitions therein do not conflict with the stated or implied definitions presented herein.

Any catalyst system in which the two (or more) catalyst components have substantially different chain transfer agent responses may be used. The catalyst system can be a Ziegler-Natta catalyst combined with a single site catalyst, two Ziegler-Natta catalysts, or two single site catalysts. In a preferred embodiment, the catalyst system is made up of two Ziegler-Natta catalysts. In a preferred embodiment, the Ziegler-Natta catalysts have titanium and hafnium active catalyst sites.

U.S. Pat. Appl. Pub. No. US2005/0228138A1 to Davis et al., which is herein incorporated by reference to the extent that definitions therein do not conflict with the stated or implied definitions presented herein, discloses several bicomponent catalyst systems which may be implemented in various embodiments of the present invention.

For controlling bimodal molecular weights, a method employing two mixed (biselective) catalyst compositions may be used. For instance, if one biselective catalyst blend independently generates a product with a 70% HMW, 30% LMW split and the other generates a 50% HMW, 50% LMW product, the range of products possible for all relative catalyst feed rates would be from 50 to 70% HMW, compared to a range of 0 to 100% if separate HMW and LMW producing feeds are used. Illustrative bimodal catalysts are available from UNIVATION TECHNOLOGIES having a sales office at Houston, Tex.

The catalysts usable in the various embodiments and permutations of the present invention are not limited to the catalysts described above, as the foregoing does not represent an exhaustive list of all suitable olefin polymerization catalysts.

Operating Conditions

The operating conditions of the reactor and other systems are not narrowly critical to the invention in some embodiments. While general operating conditions have been provided above for fluidized bed polymerization reactor systems, fluidized and nonfluidized bed systems can, in addition to those listed above, have widely varying process conditions, such as temperature, pressure, fluid flowrate, etc.

The operating conditions of the reactor and other systems are critical to the invention in other embodiments. For example, higher operating temperatures generally allow a higher maximum production rate. Therefore, an aspect of the present invention uses a high operating temperature in order to obtain a high production rate. A catalyst may be selected to produce a desired product at the selected optimum temperature. The amount of oxygen is selected as set forth herein.

As mentioned above, preferred embodiments operate at an optimum temperature to maximize the production rate. The optimum operating temperature, of course, is a relative term, as the temperature at various points in the reactor system will be different. Therefore, the optimum operating temperature may be based on a temperature in the fluidized bed, in a cycle stream (before or after the heat exchanger), etc. The optimum operating temperature can also be based on an average of preferred temperatures at various points in the system.

Considerations when selecting the optimum temperature include functionality of the catalyst at a given temperature, the melting point of the polymer product, etc. In generally preferred embodiments, the optimum temperature will fall within the ranges provided above.

Oxygen Feed Lines

With further reference to FIG. 1 in an embodiment, one or more oxygen feed lines 140 are present to allow injection of oxygen into the reactor system 100.

In general, as noted above, the particular oxygen feed system of the methods and systems and apparatus of the present invention is not limited. Generally, the oxygen feed lines 140 are coupled to a gas controller 150 that is in turn coupled to a source of oxygen (not shown).

The source of oxygen may be a tank containing pure or substantially pure oxygen. More typically, the oxygen is diluted in an inert gas such as Ar, $N_2$, etc. Generally, the more dilute the oxygen, the greater the control the system or operator will have over the quantity of oxygen added to the system 100.

The amount of oxygen added may be controlled by gas controller 150 in cooperation with flow control valves (not shown) in communication with the gas controller 150, and located on the oxygen feed lines.

Products

Polyolefins that may be produced according to the invention include, but are not limited to, those made from olefin monomers such as ethylene and linear or branched higher alpha-olefin monomers containing 3 to about 20 carbon atoms. Homopolymers or interpolymers of ethylene and such higher alpha-olefin monomers, with densities ranging from about 0.860 to about 0.970 may be made. Suitable higher alpha-olefin monomers include, for example, propylene, 1-butene, 1-pentene, 1-hexene, 4-methyl-1-pentene, and 1-octene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific polyolefins that may be made according to the invention include, for example, high density polyethylene, medium density polyethylene (including ethylene-butene copolymers and ethylene-hexene copolymers), homopolymer polyethylene, polypropylene, ethylene/propylene rubber (EPR), ethylene/propylene/diene terpolymers (EPDM), polybutadiene, polyisoprene and the like.

It should be kept in mind that various steps performed in the methodology presented herein may be performed in any combination in each of the various combinations and permutations of the present invention.

Separation System

With reference to FIG. 4, an exemplary separation system 180 is shown according to one embodiment. The separation system 180 may be used to describe how product may be discharged from the top or bottom of a reactor. The separation system 180 in FIG. 4 may be used with the reactor 102 in FIG. 1.

For example, a typical bottom discharge sequence that is able to discharge product/polymer from the bottom discharge point 123 may be as follows. First, open valve 186 for a time, e.g., 2 seconds, to vent off the equalization line 182, then close valve 186. Next, open valve 134 to allow powder from the bottom of the reactor 102 to fill the equalization line 182. Then, open upper discharge valve 138 to allow some of the gas to flow through the upper discharge valve as well as to allow filling of the equalization line 182 with more powder.

Continuing with the above example, close both valves 138 and 134 simultaneously. Next, open valve 186 to allow equalization line 182 to depressurize and begin to flow into purge vessel 105. Then, open valve 184 to send high pressure $N_2$ (about 400 psig) from vessel 194 to force the material in the equalization line 182 into the purge vessel 105. Then, close valve 184 to shutoff the flow of high pressure $N_2$. After that, close valve 186, and open valve 188 to send medium pressure $N_2$ (about 35 psi) from vessel 198 to force the contents inside pipe 120 into the purge vessel 105.

To finish the above example, close valve 188 to shutoff the flow of medium pressure $N_2$, and open valve 192 to discharge product/polymer from the purge vessel 105 into purge vessel 196. $N_2$ can be fed into purge vessel 196 to purge hydrocarbons from the product/polymer. Later, the purged product/polymer may be discharged into a tote bin through discharge valve 190.

With continued reference to FIG. 4, an exemplary top discharge sequence may be described. For example, a typical top discharge sequence that is able to discharge product/polymer from the top discharge point 125 may be as follows. First, open valve 186 for a time, e.g., 2 seconds, to vent off the equalization line 182, and then close valve 186. Next, open valve 138 to allow powder from the top of the reactor 102 to fill the equalization line 182. Then, close valve 138.

Next, open valve 186 to allow equalization line 182 to depressurize and begin to flow into purge vessel 105. Open valve 184 to send high pressure $N_2$ to sweep the contents of the equalization line 182 into the purge vessel 105. Close valve 184 to shutoff the high pressure $N_2$, and close valve 186. Open valve 188 to send medium pressure $N_2$ to sweep the contents inside the pipe 120 into the purge vessel 105, and close valve 188 to shutoff the medium pressure $N_2$.

Then, open valve 192 to discharge product/polymer from purge vessel 105 into purge vessel 196. $N_2$ can be fed into purge vessel 196 to purge hydrocarbons from the product/ polymer. Later, the purged product/polymer may be discharged into a tote bin through discharge valve 190.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

The invention disclosed herein has been used in an UNIPOL™ Reactor pilot plant (available for license from Univation Technologies, LLC, Houston, Tex.) to collect data on the operating conditions and effectiveness of the invention. In one such experiment, an upper bed level differential pressure (DP) probe was used in conjunction with measuring the percentage of fines in the reactor at a given time. In addition, an entrainment static meter was used to determine a correlation between entrained fines, pressure, and bed height.

Figure 2:
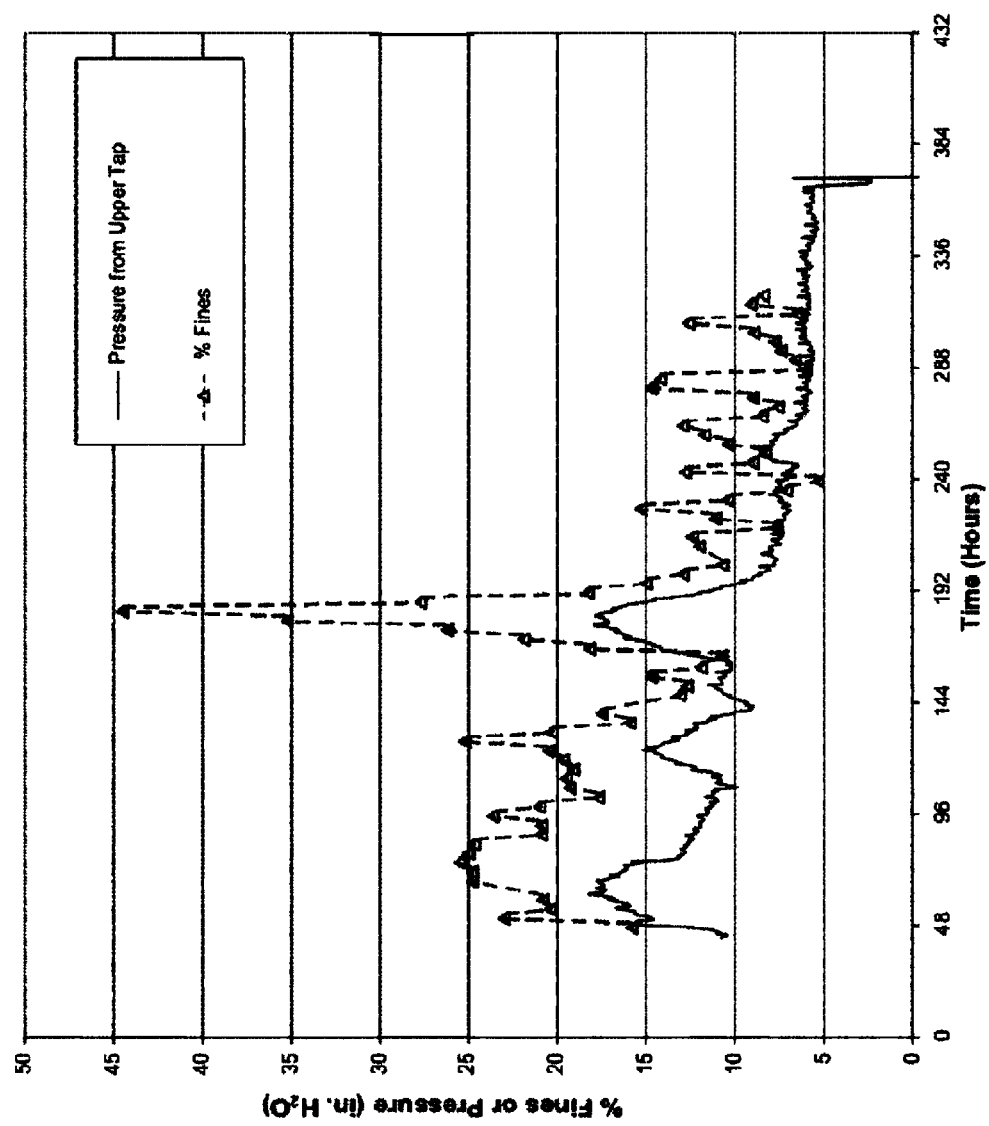
FIG. 2 is a plot of experimental data showing % Fines and Pressure versus Time, which indicates a correlation between % Fines and Pressure.

With reference to FIG. 2, the correlation between percentage of fines in the reactor and the pressure as reported from the upper tap is shown according to one experiment. The dashed line with triangles indicates the percentage of fines in the reactor. As can be seen, over several days, as the percentage of fines in the reactor bed changed, the pressure as reported from the upper tap (solid line) compared with the percentage of fines. For this experiment, the bed weight was maintained substantially constant and it was determined by using the taps from the lower part of the reactor. The results show how well the percentage of fines trends with the upper bed pressure tap reported pressure.

Figure 3:
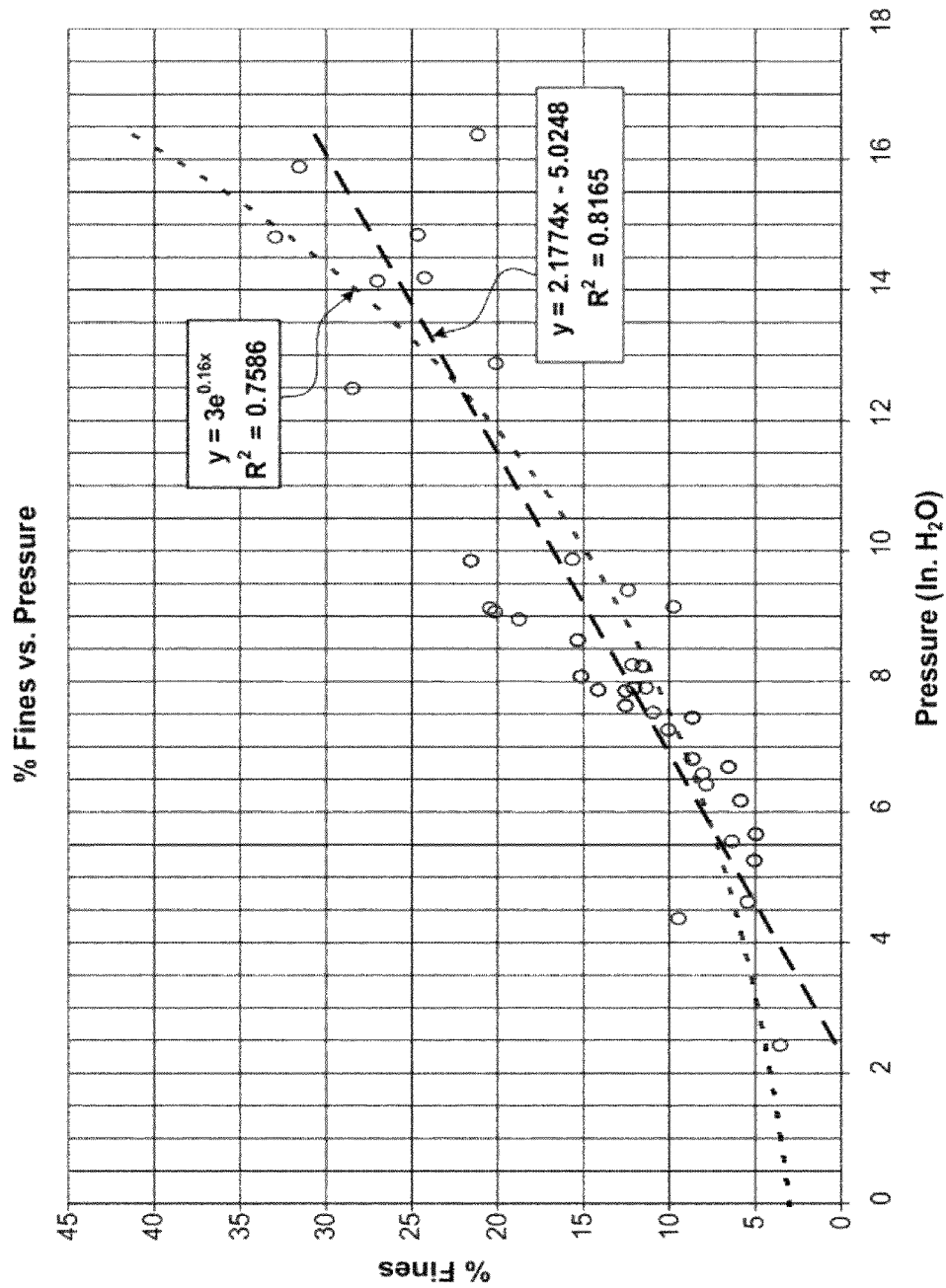
FIG. 3 is a plot of % Fines versus Pressure as reported from several runs.

Now referring to FIG. 3, data from many pilot plants were used to produce a graph of percentage of fines versus pressure as reported from the upper tap, which can be used to determine a best fit line to represent the correlation between the two variables. Two equations are shown, with the lines they produce indicated. There is a first order approximation and a second order approximation, along with associated $R^2$ values indicating how well the lines "fit" the data.

As previously mentioned, a static meter in the upper section of the reactor was also monitored to determine a correlation between it's output and pressure tap readings. Although the data compared and the trends appear to be coincident, there is a much higher level of noise produced by the static meter.

It is also known in the fluidization literature that the fluidization bulk density changes with the particle size. This basis makes it reasonable that the above trends were observed (fines vs. upper pressure or level tap) at a constant bed weight. The results of the experiments show that the upper bed tap data or the data from the static meter can be used to monitor the operation. For example, if the average particle size increases (indicating that the fines are lower), then there are more larger particles in the reactor. Having a higher percentage of larger particles in the reactor makes it less fluidized and the total height of the particles will be lower. Alternatively, as the amount of fines increases, the bed of particles is easier to fluidize and "appears" lighter to the upwards flowing gas and would show a higher overall bed height. All of these comparisons are made at the same bed weight.

For example, if total bed weight is 525 lbs, then with more fines in the reactor, it would be expected that the total bed height would be higher. The upper pressure tap is the upper bed height and the data appears consistent with this description. If the total bed weight is constant, but meanwhile, the upper bed level begins to increase, this would indicate that the amount of fines that are being made in the reactor is increasing. This indication would help define when to begin taking drops of product from the upper discharge point of the reactor to prevent getting too much fines in the cycle gas and possibly causing problems in the cycle gas system. Without this indication, the polymer sample from the reactor would go to the laboratory and it also would show that the amount of fines is increasing, but because the lab data is not online or readily assessable, it would take more effort and time to conclude that the percentage of fines are increasing to an undesirable level, and the change may not be noticed until the system has already suffered damage due to the condition.

Example 1

Table 1 shows operating parameters and data from several experimental runs in a pilot plant. In all runs, ethylene was polymerized in a gas phase catalytic reaction process. The catalyst was PRODIGY™ Bimodal Catalyst, available from UNIVATION TECHNOLOGIES having a sales office at Houston, Tex. The reactor vessel was 22.5 inches (575.1 mm) in diameter. Samples were removed from the bottom and upper sections of the reactor and combined. The final row of Table 1 shows the weight percent fines (<125 mesh) in the combined polymer product sample for each run, as determined by screening the sample.

TABLE 1

Runs #1-8

| | Run # | | | | | | | |
|---|---|---|---|---|---|---|---|---|
| | 1 | 2 | 3 | 4 | 5 | 6 | 7 | 8 |
| Bed Turnovers (BTO's) (whole part) | 6.58 | 5.66 | 14.74 | 5.48 | 7.08 | 5.47 | 32.05 | 5.77 |
| BTO's (During Process Avg) | 0.8 | 1.2 | 2.3 | 2.3 | 1.6 | 1.3 | 1.5 | 1.3 |
| Reactor Residence Time, Hr | 5.18 | 4.97 | 4.43 | 4.40 | 6.08 | 6.11 | 4.05 | 4.73 |
| C2 Concentration (mole %) | 69.6 | 69.9 | 70.0 | 70.0 | 70.0 | 70.0 | 70.1 | 69.9 |
| C2 Partial Pressure (psia) | 219 | 220 | 220 | 220 | 220 | 220 | 220 | 220 |
| H2 Concentration (ppm) | 2773 | 2793 | 2554 | 2806 | 1347 | 1195 | 2176 | 1774 |
| H2/C2 Analyzer Ratio (ppm/mole %) | 39.91 | 39.94 | 36.48 | 40.11 | 19.26 | 17.07 | 31.04 | 25.36 |
| Hexene conc (mole %) | 0.50 | 0.49 | 0.49 | 0.48 | 0.56 | 0.49 | 0.44 | 0.41 |
| C6/C2 Analyzer Ratio | 0.0072 | 0.0070 | 0.0070 | 0.0068 | 0.0080 | 0.0071 | 0.0062 | 0.0059 |
| C2 Feed (lb/hr) | 151 | 175 | 196 | 194 | 148 | 144 | 141 | 171 |
| H2/C2 Flow Ratio (Mlb/lb) | 0.351 | 0.359 | 0.347 | 0.335 | 0.180 | 0.173 | 0.297 | 0.214 |
| C6/C2 Flow Ratio | 0.0202 | 0.0218 | 0.0214 | 0.0188 | 0.0209 | 0.0182 | 0.0153 | 0.0143 |
| IC5 (mole %) | 4.6 | 4.7 | 4.6 | 4.6 | 5.6 | 5.7 | 6.5 | 6.3 |
| N2 Conc (mole %) | 25.05 | 24.61 | 24.67 | 24.73 | 23.70 | 23.73 | 22.78 | 23.12 |
| Reactor Vent Rate (lb/hr) | 44.66 | 37.31 | 48.64 | 52.65 | 38.87 | 34.16 | 35.96 | 36.34 |
| Reactor Pressure (psia) | 314.7 | 314.4 | 314.7 | 314.5 | 314.7 | 314.1 | 314.3 | 314.3 |
| Bed Temperature (deg F.) | 185.8 | 185.7 | 185.7 | 185.7 | 212.7 | 212.6 | 212.6 | 212.7 |
| Exchanger dp (psi) | 0.432 | 0.443 | 0.427 | 0.435 | 0.464 | 0.461 | 0.436 | 0.442 |
| Plate dp ("H2O) | 75.70 | 77.09 | 76.01 | 73.10 | 70.75 | 70.63 | 54.75 | 53.88 |
| Gas Velocity (ft/sec) | 2.00 | 2.00 | 2.00 | 2.00 | 1.95 | 1.95 | 2.00 | 2.00 |
| Bed Weight (lbs) | 476.3 | 566.7 | 565.7 | 567.1 | 536.8 | 539.2 | 483.3 | 499.2 |
| Cat feed rate (g/hr) | 3.96 | 4.95 | 4.95 | 4.95 | 5.94 | 3.96 | 3.96 | 4.55 |
| Production Rate (lb/hr) | 92.0 | 114.0 | 127.7 | 128.8 | 88.3 | 88.3 | 119.3 | 105.5 |
| Drops | | | | | | | | |
| Density (gm/cc) | 0.9477 | 0.9455 | 0.9458 | 0.9461 | 0.9434 | 0.9450 | 0.9482 | 0.9517 |
| Bulk Density (gm/cc) | 0.4208 | 0.4098 | 0.4195 | 0.3668 | 0.4044 | 0.4250 | 0.3888 | 0.3807 |
| Fines (wt %) <125mesh | 20.1 | 28.4 | 5.4 | 15.6 | 9.4 | 3.5 | 18.7 | 20.4 |

Runs #9-16

| | Run # | | | | | | | |
|---|---|---|---|---|---|---|---|---|
| | 9 | 10 | 11 | 22 | 13 | 14 | 15 | 16 |
| Bed Turnovers (whole part) | 7.00 | 9.26 | 25.24 | 18.96 | 17.09 | 0.83 | 1.16 | 1.13 |
| BTO's (During Process Avg) | 1.4 | 2.1 | 1.2 | 1.7 | 1.5 | 1.2 | 1.5 | 1.5 |
| Reactor Residence | 4.36 | 3.84 | 5.19 | 4.83 | 5.26 | 4.88 | 5.27 | 5.21 |

TABLE 1-continued

| Time, hr | 69.9 | 70.0 | 70.0 | 70.0 | 70.0 | 69.9 | 70.0 | 70.0 |
|---|---|---|---|---|---|---|---|---|
| C2 Concentration (mole %) | | | | | | | | |
| C2 Partial Pressure (psia) | 220 | 220 | 220 | 220 | 220 | 220 | 220 | 220 |
| H2 Concentration (ppm) | 1504 | 2415 | 2091 | 2083 | 3155 | 1739 | 1752 | 1734 |
| H2/C2 Analyzer Ratio (ppm/mole %) | 21.50 | 34.52 | 29.88 | 29.78 | 45.08 | 24.86 | 25.03 | 24.75 |
| Hexene conc (mole %) | 0.41 | 0.49 | 0.52 | 0.40 | 0.40 | 0.47 | 0.49 | 0.48 |
| C6/C2 Analyzer Ratio | 0.0059 | 0.0070 | 0.0074 | 0.0057 | 0.0057 | 0.0067 | 0.0071 | 0.0069 |
| C2 Feed (lb/hr) | 177 | 184 | 160 | 163 | 146 | 160 | 159 | 163 |
| H2/C2 Flow Ratio (Mlb/lb) | 0.179 | 0.395 | 0.296 | 0.370 | 0.479 | 0.262 | 0.260 | 0.263 |
| C6/C2 Flow Ratio | 0.0140 | 0.0199 | 0.0189 | 0.0157 | 0.0169 | 0.0186 | 0.0186 | 0.0185 |
| IC5 (mole %) | 6.1 | 6.1 | 6.2 | 5.0 | 5.2 | 6.0 | 6.0 | 6.3 |
| N2 Conc (mole %) | 23.34 | 23.16 | 23.12 | 24.39 | 24.09 | 23.42 | 23.33 | 23.04 |
| Reactor Vent Rate (lb/hr) | 38.01 | 36.45 | 41.58 | 40.71 | 42.36 | 42.06 | 40.19 | 42.40 |
| Reactor Pressure (psia) | 314.5 | 314.5 | 314.6 | 314.5 | 314.6 | 314.4 | 314.6 | 314.5 |
| Bed Temperature (deg F.) | 185.7 | 185.7 | 185.6 | 185.7 | 185.8 | 185.7 | 185.7 | 185.7 |
| Exchanger dp (psi) | 0.464 | 0.501 | 0.415 | 0.415 | 0.414 | 0.406 | 0.475 | 0.469 |
| Plate dp ("H2O) | 54.73 | 57.48 | 45.70 | 25.19 | 18.52 | 30.88 | 24.06 | 26.00 |
| Gas Velocity (ft/sec) | 2.00 | 2.00 | 2.00 | 2.00 | 2.00 | 2.00 | 2.00 | 2.00 |
| Bed Weight (lbs) | 498.3 | 498.1 | 516.6 | 516.3 | 516.5 | 520.8 | 520.6 | 521.6 |
| Cat feed rate (g/hr) | 3.96 | 2.97 | 2.97 | 2.63 | 2.38 | 2.97 | 3.03 | 2.97 |
| Production Rate (lb/hr) Drops | 114.2 | 129.8 | 99.5 | 106.9 | 98.3 | 106.8 | 98.9 | 100.1 |
| Density (gm/cc) | 0.9492 | 0.9513 | 0.9461 | 0.9506 | 0.9498 | 0.9466 | 0.9462 | 0.9462 |
| Bulk Density (gm/cc) | 0.3995 | 0.4395 | 0.4035 | 0.4093 | 0.4218 | 0.4080 | 0.4253 | 0.4268 |
| Fines (wt %) <125mesh | 10.0 | 7.8 | 11.5 | 12.5 | 5.0 | 15.1 | 8.6 | 6.5 |

Runs #17-24

| | Run # | | | | | | | |
|---|---|---|---|---|---|---|---|---|
| | 17 | 18 | 19 | 20 | 21 | 22 | 23 | 24 |
| Bed Turnovers (whole part) | 0.95 | 0.97 | 1.10 | 22.73 | 23.04 | 4.50 | 3.21 | 3.77 |
| BTO's (During Process Avg) | 1.4 | 1.4 | 1.6 | 1.8 | 1.4 | 0.9 | 1.4 | 0.9 |
| Reactor Residence Time, hr | 4.35 | 4.37 | 5.09 | 3.41 | 4.21 | 4.42 | 4.20 | 4.45 |
| C2 Concentration (mole %) | 69.4 | 70.0 | 70.2 | 69.9 | 70.0 | 70.0 | 69.9 | 69.7 |
| C2 Partial Pressure (psia) | 218 | 220 | 221 | 219 | 220 | 220 | 220 | 219 |
| H2 Concentration (ppm) | 1434 | 1399 | 1463 | 3133 | 2794 | 2806 | 2775 | 2072 |
| H2/C2 Analyzer Ratio (ppm/mole %) | 20.76 | 19.98 | 20.84 | 44.86 | 39.93 | 40.12 | 39.68 | 29.74 |
| Hexene conc (mole %) | 0.47 | 0.50 | 0.51 | 0.39 | 0.35 | 0.35 | 0.35 | 0.35 |
| C6/C2 Analyzer Ratio | 0.0068 | 0.0071 | 0.0072 | 0.0055 | 0.0050 | 0.0050 | 0.0050 | 0.0050 |
| C2 Feed (lb/hr) | 182 | 181 | 157 | 192 | 184 | 185 | 180 | 167 |
| H2/C2 Flow Ratio (Mlb/lb) | 0.201 | 0.218 | 0.228 | 0.425 | 0.427 | 0.353 | 0.359 | 0.293 |
| C6/C2 Flow Ratio | 0.0170 | 0.0179 | 0.0190 | 0.0167 | 0.0136 | 0.0124 | 0.0122 | 0.0116 |

TABLE 1-continued

| | | | | | | | |
|---|---|---|---|---|---|---|---|
| IC5 (mole %) | 6.3 | 6.1 | 6.1 | 4.9 | 7.0 | 7.2 | 7.2 | 7.3 |
| N2 Conc (mole %) | 23.71 | 23.20 | 23.06 | 24.55 | 22.40 | 22.25 | 22.26 | 22.49 |
| Reactor Vent Rate (lb/hr) | 40.41 | 40.62 | 41.45 | 34.17 | 10.36 | 8.08 | 7.22 | 13.57 |
| Reactor Pressure (psia) | 314.5 | 314.5 | 314.6 | 312.8 | 314.4 | 314.3 | 313.9 | 314.2 |
| Bed Temperature(deg F.) | 185.9 | 185.8 | 185.7 | 185.2 | 183.6 | 197.5 | 197.5 | 197.8 |
| Exchanger dp (psi) | 0.469 | 0.468 | 0.462 | 0.418 | 0.475 | 0.489 | 0.450 | 0.453 |
| Plate dp ("H2O) | 23.84 | 23.46 | 22.45 | 32.56 | 91.46 | 92.18 | 92.50 | 93.02 |
| Gas Velocity (ft/sec) | 2.00 | 2.00 | 2.00 | 2.00 | 2.00 | 2.00 | 2.00 | 2.00 |
| Bed Weight (lbs) | 521.4 | 520.9 | 520.8 | 521.9 | 517.7 | 517.4 | 518.1 | 517.2 |
| Cat feed rate (g/hr) | 2.97 | 2.93 | 2.57 | 2.97 | 5.54 | 5.54 | 5.54 | 5.54 |
| Production Rate (lb/hr) | 120.0 | 119.3 | 102.3 | 153.2 | 123.0 | 117.0 | 123.3 | 116.3 |
| Density (gm/cc) | 0.9469 | 0.9464 | 0.9459 | 0.9482 | 0.9515 | 0.9481 | 0.9486 | 0.9500 |
| Bulk Density (gm/cc) | No Data | 0.4235 | 0.4308 | 0.3743 | 0.3983 | no data | 0.3985 | no data |
| Fines (wt %) <125mesh | No Data | 5.8 | 4.9 | 12.5 | 12.1 | no data | 9.7 | no data |

Runs #25-32

| | | | | | | | | |
|---|---|---|---|---|---|---|---|---|
| Run # | 25 | 26 | 27 | 28 | 29 | 30 | 31 | 32 |
| Bed Turnovers (whole part) | 3.87 | 14.59 | 3.84 | 4.49 | 11.63 | 17.16 | 25.24 | 18.96 |
| BTO's (During Process Avg) | 1.5 | 1.6 | 0.9 | 1.5 | 1.6 | 1.7 | 1.2 | 1.7 |
| Reactor Residence Time, hr | 4.11 | 3.83 | 4.41 | 4.00 | 3.68 | 3.63 | 5.19 | 4.83 |
| C2 Concentration (mole %) | 70.2 | 70.0 | 69.9 | 70.0 | 70.0 | 70.0 | 70.0 | 70.0 |
| C2 Partial Pressure (psia) | 220 | 219 | 219 | 220 | 220 | 220 | 220 | 220 |
| H2 Concentration (ppm) | 2099 | 3509 | 3523 | 2799 | 2805 | 2449 | 2091 | 2083 |
| H2/C2 Analyzer Ratio (ppm/mole %) | 29.91 | 50.12 | 50.43 | 40.00 | 40.07 | 34.98 | 29.88 | 29.78 |
| Hexene conc (mole %) | 0.35 | 0.35 | 0.34 | 0.35 | 0.35 | 0.41 | 0.52 | 0.40 |
| C6/C2 Analyzer Ratio | 0.0050 | 0.0050 | 0.0049 | 0.0050 | 0.0050 | 0.0058 | 0.0074 | 0.0057 |
| C2 Feed (lb/hr) | 182 | 201 | 179 | 195 | 194 | 215 | 160 | 163 |
| H2/C2 Flow Ratio (Mlb/lb) | 0.301 | 0.377 | 0.334 | 0.290 | 0.301 | 0.243 | 0.296 | 0.370 |
| C6/C2 Flow Ratio | 0.0120 | 0.0127 | 0.0123 | 0.0122 | 0.0123 | 0.0138 | 0.0189 | 0.0157 |
| IC5 (mole %) | 7.1 | 7.0 | 7.1 | 6.9 | 7.0 | 6.9 | 6.2 | 5.0 |
| N2 Conc (mole %) | 22.18 | 22.31 | 22.33 | 22.53 | 22.40 | 22.41 | 23.12 | 24.39 |
| Reactor Vent Rate (lb/hr) | 16.43 | 10.41 | 5.41 | 11.92 | 9.73 | 10.17 | 41.58 | 40.71 |
| Reactor Pressure (psia) | 313.9 | 313.2 | 313.4 | 314.0 | 313.8 | 313.8 | 314.6 | 314.5 |
| Bed Temperature(deg F.) | 197.6 | 199.6 | 212.6 | 212.6 | 212.6 | 212.7 | 185.6 | 185.7 |
| Exchanger dp (psi) | 0.451 | 0.435 | 0.448 | 0.464 | 0.467 | 0.497 | 0.415 | 0.415 |
| Plate dp ("H2O) | 93.73 | 93.18 | 93.36 | 94.08 | 93.95 | 93.37 | 45.70 | 25.19 |
| Gas Velocity (ft/sec) | 2.00 | 2.00 | 2.00 | 2.00 | 2.00 | 2.00 | 2.00 | 2.00 |
| Bed Weight (lbs) | 516.1 | 526.0 | 523.6 | 523.9 | 524.4 | 526.3 | 516.6 | 516.3 |
| Cat feed rate (g/hr) | 5.54 | 5.54 | 6.93 | 6.93 | 6.93 | 6.93 | 2.97 | 2.63 |
| Production Rate (lb/hr) | 125.5 | 137.3 | 118.8 | 131.0 | 142.3 | 145.2 | 99.5 | 106.9 |
| Density (gm/cc) | 0.9455 | 0.9463 | 0.9468 | 0.9484 | 0.9496 | 0.9481 | 0.9461 | 0.9506 |

TABLE 1-continued

Runs #33-40

| | Run # | | | | | | | |
|---|---|---|---|---|---|---|---|---|
| | 33 | 34 | 35 | 36 | 37 | 38 | 39 | 40 |
| Bulk Density (gm/cc) | 0.4178 | 0.3430 | no data | 0.3610 | 0.3808 | 0.3768 | 0.4035 | 0.4093 |
| Fines (wt %) <125mesh | 8.0 | 24.2 | no data | 31.5 | 32.9 | 21.1 | 11.5 | 12.5 |
| Bed Turnovers (whole part) | 17.09 | 0.83 | 1.16 | 1.13 | 0.95 | 0.97 | 1.10 | 22.73 |
| BTO's (During Process Avg) | 1.5 | 1.2 | 1.5 | 1.5 | 1.4 | 1.4 | 1.6 | 1.8 |
| Reactor Residence Time, hr | 5.26 | 4.88 | 5.27 | 5.21 | 4.35 | 4.37 | 5.09 | 3.41 |
| C2 Concentration (mole %) | 70.0 | 69.9 | 70.0 | 70.0 | 69.4 | 70.0 | 70.2 | 69.9 |
| C2 Partial Pressure (psia) | 220 | 220 | 220 | 220 | 218 | 220 | 221 | 219 |
| H2 Concentration (ppm) | 3155 | 1739 | 1752 | 1734 | 1434 | 1399 | 1463 | 3133 |
| H2/C2 Analyzer Ratio | 45.08 | 24.86 | 25.03 | 24.75 | 20.76 | 19.98 | 20.84 | 44.86 |
| Hexene conc (mole %) | 0.40 | 0.47 | 0.49 | 0.48 | 0.47 | 0.50 | 0.51 | 0.39 |
| C6/C2 Analyzer Ratio | 0.0057 | 0.0067 | 0.0071 | 0.0069 | 0.0068 | 0.0071 | 0.0072 | 0.0055 |
| C2 Feed (lb/hr) | 146 | 160 | 159 | 163 | 182 | 181 | 157 | 192 |
| H2/C2 Flow Ratio (ppm/mole %) | 0.479 | 0.262 | 0.260 | 0.263 | 0.201 | 0.218 | 0.228 | 0.425 |
| C6/C2 Flow Ratio (Mlb/lb) | 0.0169 | 0.0186 | 0.0186 | 0.0185 | 0.0170 | 0.0179 | 0.0190 | 0.0167 |
| IC5 (mole %) | 5.2 | 6.0 | 6.0 | 6.3 | 6.3 | 6.1 | 6.1 | 4.9 |
| N2 Conc (mole %) | 24.09 | 23.42 | 23.33 | 23.04 | 23.71 | 23.20 | 23.06 | 24.55 |
| Reactor Vent Rate (lb/hr) | 42.36 | 42.06 | 40.19 | 42.40 | 40.41 | 40.62 | 41.45 | 34.17 |
| Reactor Pressure (psia) | 314.6 | 314.4 | 314.6 | 314.5 | 314.5 | 314.6 | 314.6 | 312.8 |
| Bed Temperature (deg F.) | 185.8 | 185.7 | 185.7 | 185.7 | 185.9 | 185.8 | 185.7 | 185.2 |
| Exchanger dp (psi) | 0.414 | 0.406 | 0.475 | 0.469 | 0.469 | 0.468 | 0.462 | 0.418 |
| Plate dp ("H2O) | 18.52 | 30.88 | 24.06 | 26.00 | 23.84 | 23.46 | 22.45 | 32.56 |
| Gas Velocity (ft/sec) | 2.00 | 2.00 | 2.00 | 2.00 | 2.00 | 2.00 | 2.00 | 2.00 |
| Bed Weight (lbs) | 516.5 | 520.8 | 520.6 | 521.6 | 521.4 | 520.9 | 520.8 | 521.9 |
| Cat feed rate (g/hr) | 2.38 | 2.97 | 3.03 | 2.97 | 2.97 | 2.93 | 2.57 | 2.97 |
| Production Rate (lb/hr) | 98.3 | 106.8 | 98.9 | 100.1 | 120.0 | 119.3 | 102.3 | 153.2 |
| Density (gm/cc) | 0.9498 | 0.9466 | 0.9462 | 0.9462 | 0.9469 | 0.9464 | 0.9459 | 0.9482 |
| Bulk Density (gm/cc) | 0.4218 | 0.4080 | 0.4253 | 0.4268 | no data | 0.4235 | 0.4308 | 0.3743 |
| Fines (wt %) <125mesh | 5.0 | 15.1 | 8.6 | 6.5 | no data | 5.8 | 4.9 | 12.5 |

Runs #41-49

| | Run # | | | | | | | | |
|---|---|---|---|---|---|---|---|---|---|
| | 41 | 42 | 43 | 44 | 45 | 46 | 47 | 48 | 49 |
| Bed Turnovers (whole part) | 6.35 | 5.51 | 3.09 | 6.11 | 3.69 | 15.60 | 15.16 | 5.48 | 7.28 |
| BTO's (During Process Avg) | 1.4 | 1.6 | 2.3 | 1.5 | 0.9 | 3.0 | 1.9 | 1.7 | 1.9 |

TABLE 1-continued

Runs #50-59

| | 50 | 51 | 52 | 53 | 54 | 55 | 56 | 57 | 58 | 59 |
|---|---|---|---|---|---|---|---|---|---|---|
| Reactor Residence Time, hr | 4.23 | 4.94 | 5.18 | 5.36 | 6.92 | 3.39 | 3.11 | 3.55 | 3.08 | |
| C2 Concentration (mole %) | 69.7 | 70.0 | 70.0 | 69.6 | 69.1 | 69.8 | 78.4 | 69.7 | 70.2 | |
| C2 Partial Pressure (psia) | 219 | 220 | 220 | 219 | 217 | 216 | 285 | 219 | 220 | |
| H2 Concentration (ppm) | 2777 | 2799 | 2801 | 2800 | 1736 | 1753 | 1996 | 1728 | 1771 | |
| H2/C2 Analyzer Ratio (ppm/mole %) | 39.81 | 39.96 | 40.04 | 40.23 | 25.12 | 25.12 | 25.47 | 24.82 | 25.23 | |
| Hexene conc (mole %) | 0.48 | 0.35 | 0.35 | 0.34 | 0.41 | 0.43 | 0.47 | 0.41 | 0.42 | |
| C6/C2 Analyzer Ratio | 0.0069 | 0.0050 | 0.0050 | 0.0049 | 0.0060 | 0.0061 | 0.0060 | 0.0059 | 0.0061 | |
| C2 Feed (lb/hr) | 172 | 151 | 153 | 166 | 130 | 204 | 274 | 203 | 219 | |
| H2/C2 Flow Ratio (Mlb/lb) | 0.409 | 0.431 | 0.410 | 0.401 | 0.226 | 0.262 | 0.294 | 0.287 | 0.299 | |
| C6/C2 Flow Ratio | 0.0206 | 0.0153 | 0.0170 | 0.0143 | 0.0156 | 0.0157 | 0.0147 | 0.0148 | 0.0157 | |
| IC5 (mole %) | 6.8 | 7.2 | 5.4 | 7.5 | 5.8 | 5.7 | 4.8 | 6.2 | 5.9 | |
| N2 Conc (mole %) | 22.74 | 22.13 | 24.06 | 22.27 | 24.51 | 23.87 | 16.13 | 23.56 | 23.36 | |
| Reactor Vent Rate (lb/hr) | 36.56 | 38.34 | 43.84 | 39.02 | 31.04 | 12.47 | 21.80 | 15.51 | 12.17 | |
| Reactor Pressure (psia) | 314.3 | 314.5 | 314.7 | 314.6 | 314.3 | 309.9 | 364.2 | 314.1 | 313.2 | |
| Bed Temperature (deg F.) | 185.8 | 185.7 | 185.8 | 185.8 | 185.8 | 185.9 | 185.7 | 185.9 | 186.1 | |
| Exchanger dp (psi) | 0.373 | 0.361 | 0.400 | 0.303 | 0.470 | 0.444 | 0.405 | 0.441 | 0.461 | |
| Plate dp ("H2O) | 65.63 | 64.36 | 63.51 | 62.87 | 77.82 | 79.68 | 78.09 | 78.02 | 77.16 | |
| Gas Velocity (ft/sec) | 2.00 | 2.00 | 2.00 | 2.00 | 2.00 | 2.00 | 2.00 | 2.00 | 2.00 | |
| Bed Weight (lbs) | 505.7 | 507.4 | 506.1 | 506.5 | 519.1 | 523.3 | 523.4 | 522.3 | 524.5 | |
| Cat feed rate (g/hr) | 3.96 | 3.56 | 3.56 | 3.56 | 8.91 | 7.92 | 5.15 | 5.15 | 5.94 | |
| Production Rate (lb/hr) | 119.7 | 102.6 | 97.7 | 94.5 | 75.0 | 154.4 | 168.3 | 147.2 | 170.3 | |
| Density (gm/cc) | 0.9458 | 0.9487 | 0.9483 | 0.9501 | 0.9493 | 0.9459 | 0.9474 | 0.9478 | 0.9462 | |
| Bulk Density (gm/cc) | 0.4308 | 0.4150 | 0.4520 | 0.4573 | 0.4210 | 0.4082 | 0.3390 | 0.3395 | 0.3785 | |
| Fines (wt %) <125mesh | 21.5 | 15.3 | 14.1 | 12.0 | 20.1 | 6.3 | 24.6 | 27.0 | 12.4 | |

Run #

| | 50 | 51 | 52 | 53 | 54 | 55 | 56 | 57 | 58 | 59 |
|---|---|---|---|---|---|---|---|---|---|---|
| Bed Turnovers (whole part) | 8.34 | 22.20 | 18.26 | 10.62 | 8.37 | 28.06 | 3.01 | 7.48 | 5.96 | 27.27 |
| BTO's (During Process Avg) | 1.8 | 1.5 | 2.0 | 2.5 | 1.2 | 1.9 | 0.8 | 1.5 | 1.6 | 1.3 |
| Reactor Residence Time, hr | 3.25 | 3.99 | 4.08 | 3.16 | 3.23 | 4.21 | 7.59 | 4.04 | 3.75 | 4.45 |
| C2 Concentration (mole %) | 70.0 | 70.0 | 70.1 | 80.0 | 69.5 | 70.0 | 70.0 | 70.5 | 70.0 | 69.9 |
| C2 Partial Pressure (psia) | 213 | 220 | 220 | 291 | 219 | 220 | 220 | 220 | 220 | 220 |
| H2 Concentration (ppm) | 1779 | 1750 | 1751 | 2000 | 1715 | 1749 | 1754 | 2851 | 2803 | 2803 |
| H2/C2 Analyzer Ratio (ppm/mole %) | 25.43 | 24.99 | 25.01 | 25.01 | 24.67 | 25.00 | 25.07 | 40.40 | 40.03 | 40.08 |
| Hexene conc (mole %) | 0.42 | 0.42 | 0.42 | 0.49 | 0.42 | 0.42 | 0.43 | 0.34 | 0.35 | 0.29 |
| C6/C2 Analyzer Ratio | 0.0061 | 0.0061 | 0.0060 | 0.0061 | 0.0060 | 0.0060 | 0.0061 | 0.0048 | 0.0050 | 0.0041 |
| C2 Feed (lb/hr) | 217 | 189 | 197 | 261 | 225 | 206 | 157 | 166 | 158 | 195 |
| H2/C2 Flow Ratio (Mlb/lb) | 0.317 | 0.277 | 0.299 | 0.296 | 0.288 | 0.294 | 0.222 | 0.329 | 0.347 | 0.362 |
| C6/C2 Flow Ratio | 0.0158 | 0.0163 | 0.0178 | 0.0169 | 0.0161 | 0.0157 | 0.0168 | 0.0136 | 0.0138 | 0.01 |
| | | | | | | | | | | 31 |

TABLE 1-continued

| | | | | | | | | | | |
|---|---|---|---|---|---|---|---|---|---|---|
| IC5 (mole %) | 5.4 | 5.5 | 4.1 | 2.8 | 4.0 | 3.4 | 3.6 | 4.6 | 5.5 | 3.5 |
| N2 Conc (mole %) | 24.02 | 23.85 | 25.24 | 16.53 | 25.92 | 26.03 | 25.83 | 24.36 | 23.85 | 25.97 |
| Reactor Vent Rate (lb/hr) | 18.09 | 13.46 | 19.16 | 46.81 | 22.29 | 23.48 | 50.18 | 14.32 | 14.85 | 34.69 |
| Reactor Pressure (psia) | 304.3 | 314.5 | 314.4 | 363.7 | 314.4 | 314.2 | 314.0 | 312.9 | 313.8 | 314.7 |
| Bed Temperature(deg F.) | 186.0 | 186.0 | 185.9 | 185.9 | 186.0 | 185.6 | 212.3 | 212.8 | 212.8 | 213.1 |
| Exchanger dp (psi) | 0.530 | 0.453 | 0.429 | 0.399 | 0.428 | 0.449 | 0.473 | 0.470 | 0.459 | 0.453 |
| Plate dp ("H2O) | 74.99 | 80.80 | 79.49 | 81.39 | 80.93 | 79.34 | 78.99 | 77.37 | 77.72 | 84.18 |
| Gas Velocity (ft/sec) | 2.00 | 2.00 | 2.00 | 2.00 | 2.00 | 2.00 | 2.00 | 2.00 | 2.00 | 2.00 |
| Bed Weight (lbs) | 530.5 | 522.0 | 522.8 | 520.7 | 521.3 | 522.5 | 517.1 | 518.0 | 518.9 | 504.3 |
| Cat feed rate (g/hr) | 5.15 | 5.94 | 4.95 | 4.95 | 5.94 | 3.96 | 3.96 | 4.95 | 4.95 | 6.93 |
| Production Rate (lb/hr) Drops | 163.0 | 130.8 | 128.3 | 164.6 | 161.3 | 124.0 | 68.2 | 128.2 | 138.3 | 113.3 |
| Density (gm/cc) | 0.9495 | 0.9458 | 0.9456 | 0.9471 | 0.9462 | 0.9457 | 0.9465 | 0.9483 | 0.9495 | 0.9485 |
| Bulk Density (gm/cc) | 0.3993 | 0.4108 | 0.4155 | 0.3513 | 0.3640 | 0.3975 | 0.3734 | 0.3695 | 0.3493 | no data |
| Fines (wt %) <125mesh | 10.9 | 8.6 | 9.8 | 17.6 | 13.7 | 14.0 | 30.5 | 47.2 | 27.7 | 12.3 |

Table 2 shows the differential pressure in the upper section as it corresponds to the percent fines from Table 1. A plot of the pressure differential versus percent fines is depicted in FIG. 3, discussed above.

TABLE 2

| Pressure Differential (inches water) | % Fines |
|---|---|
| 9.08 | 20.1 |
| 12.50 | 28.4 |
| 4.64 | 5.4 |
| 9.89 | 15.6 |
| 4.38 | 9.4 |
| 2.44 | 3.5 |
| 8.97 | 18.7 |
| 9.14 | 20.4 |
| 7.27 | 10 |
| 6.43 | 7.8 |
| 8.25 | 11.5 |
| 8.25 | 11.5 |
| 7.64 | 12.5 |
| 7.64 | 12.5 |
| 5.27 | 5 |
| 5.27 | 5 |
| 8.09 | 15.1 |
| 8.09 | 15.1 |
| 7.46 | 8.6 |
| 7.46 | 8.6 |
| 6.70 | 6.5 |
| 6.70 | 6.5 |
| 6.19 | 5.8 |
| 6.19 | 5.8 |
| 5.68 | 4.9 |
| 5.68 | 4.9 |
| 7.87 | 12.5 |
| 7.87 | 12.5 |
| 9.86 | 21.5 |
| 9.86 | 21.5 |
| 8.65 | 15.3 |
| 8.65 | 15.3 |
| 7.88 | 14.1 |
| 7.88 | 14.1 |
| 7.92 | 12 |
| 7.92 | 12 |
| 7.92 | 11.3 |
| 8.27 | 12.1 |
| 9.16 | 9.69 |
| 6.60 | 8 |
| 14.20 | 24.2 |
| 15.90 | 31.5 |
| 14.82 | 32.9 |
| 16.39 | 21.1 |
| 12.89 | 20.05 |
| 5.56 | 6.3 |
| 14.86 | 24.6 |
| 14.15 | 26.95 |
| 9.41 | 12.35 |
| 7.54 | 10.9 |
| 6.83 | 8.6 |
| 6.46 | 9.75 |
| 13.04 | 17.6 |
| 8.39 | 13.7 |
| 9.52 | 13.95 |
| 14.07 | 30.45 |
| 17.73 | 47.2 |
| 13.36 | 27.7 |
| 12.81 | 12.3 |
| 12.81 | 12.3 |

For purposes of certain jurisdictions, the invention also provides for the following embodiments:

1. A method comprising:
  operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
  measuring a concentration of particulates in the upper section of the reactor to obtain a first determined level of particulates in the upper section; and
  discharging at least some of the particulates from the reactor at an upper discharge point located above 0.55H as measured vertically from the distributor plate based on the first determined level.
2. The method of embodiment 1, wherein the first determined level is determined using a pressure differential between the upper section and at least one of the expanded section and the bed section.
3. The method of embodiment 1, wherein the first determined level is determined using a pressure differential between two vertically spaced points in the upper section.
4. The method of embodiment 1, wherein the first determined level is determined using a plot of the percent of fines versus a pressure in the upper section.
5. The method of embodiment 1, wherein the first determined level is determined using a static probe.
6. The method of any one of the preceding embodiments, wherein at least some of the particulates are discharged from the reactor at a point above about 0.70H.
7. The method of any one of the preceding embodiments, wherein at least some of the particulates are discharged from the reactor at a point above about 0.80H.
8. The method of any one of embodiments 1-6, wherein at least some of the particulates are discharged from the expanded section.
9. The method of any one of the preceding embodiments, wherein the particulates include particles of polymers.
10. The method of embodiment 9, wherein the polymers are poly(alpha)olefin polymers.
11. The method of any one of the preceding embodiments, further comprising also discharging particulates from the reactor at a lower discharge point located below the upper discharge point.
12. The method of embodiment 11, wherein the particulates are discharged from the upper and lower discharge points in a discharge cycle, wherein the particulates are discharged from the upper discharge point before the particulates are discharged from the lower discharge point during the discharge cycle.
13. The method of embodiment 11 or embodiment 12, wherein a discharge apparatus at the upper discharge point also functions as a pressure tap during the discharging at the lower discharge point.
14. The method of any one of the preceding embodiments, with the proviso that no particulate separation mechanism is present in a cycle gas stream coupled to the reactor.
15. The method of any one of the preceding embodiments, further comprising adding the discharged particulates to the reactor at a point below the upper discharge point.
16. A method comprising:
  operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
  discharging at least some of the particulates from the reactor at an upper discharge point located above 0.55H as measured vertically from the distributor plate; and discharging particulates from the reactor at a lower discharge point located below the upper discharge point, wherein the particulates are discharged from the upper and lower discharge points in a discharge cycle, wherein the particulates are discharged from the upper discharge point before the particulates are discharged from the lower discharge point during the discharge cycle.

17. The method of embodiment 16, wherein at least some of the particulates are discharged from the reactor at a point above about 0.70H.

18. The method of embodiment 16, wherein at least some of the particulates are discharged from the reactor at a point above about 0.80H.

19. The method of embodiment 16, wherein at least some of the particulates are discharged from the expanded section.

20. The method of any one of embodiments 16-19, wherein the particulates include particles of polymers.

21. The method of embodiment 20, wherein the polymers are poly(alpha)olefin polymers.

22. The method of any one of embodiments 16-21, with the proviso that no particulate separation mechanism is present in a cycle gas stream coupled to the reactor.

23. The method of any one of embodiments 16-22, further comprising adding the discharged particulates to the reactor at a point below the upper discharge point.

24. A method comprising:
operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
discharging at least some of the particulates from the reactor at an upper discharge point located above 0.55H as measured vertically from the distributor plate; and
discharging particulates from the reactor at a lower discharge point located below the upper discharge point, with the proviso that no particulate separation mechanism is present in a cycle gas stream coupled to the reactor.

25. The method of embodiment 24, wherein at least some of the particulates are discharged from the reactor at a point above about 0.70H.

26. The method of embodiment 24, wherein at least some of the particulates are discharged from the reactor at a point above about 0.80H.

27. The method of embodiment 24, wherein at least some of the particulates are discharged from the expanded section.

28. The method of any one of embodiments 24-27, wherein the particulates include particles of polymers.

29. The method of any one of embodiments 24-28, further comprising adding the discharged particulates to the reactor at a point below the upper discharge point.

30. The method of any one of embodiments 24-29, wherein the particulates are discharged from the upper and lower discharge points in a discharge cycle, wherein the particulates are discharged from the upper discharge point before the particulates are discharged from the lower discharge point during the discharge cycle.

31. A method for polymerizing polyolefin polymers comprising:
operating a reactor, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
contacting at least one catalyst with one or more monomers under polymerizable conditions to produce the polyolefin polymers;
measuring a concentration of particulates in the upper section of the reactor to obtain a first determined level of particulates in the upper section; and
discharging at least some of the particulates from the reactor at an upper discharge point located above 0.55H as measured vertically from the distributor plate based on the first determined level.

32. The method of embodiment 31, wherein the first determined level is determined using a pressure differential between the upper section and at least one of the expanded section and the bed section.

33. The method of embodiment 31, wherein the first determined level is determined using a pressure differential between two vertically spaced points in the upper section.

34. The method of embodiment 31, wherein the first determined level is determined using a plot of the percent of fines versus a pressure in the upper section.

35. The method of embodiment 31, wherein the first determined level is determined using a static probe.

36. The method of any one of embodiments 31-35, wherein at least some of the particulates are discharged from the reactor at a point above about 0.70H.

37. The method of any one of embodiments 31-35, wherein at least some of the particulates are discharged from the reactor at a point above about 0.80H.

38. The method of any one of embodiments 31-35, wherein at least some of the particulates are discharged from the expanded section.

39. The method of any one of embodiments 31-38, wherein the particulates include particles of polymers.

40. The method of embodiment 39, wherein the polymers are poly(alpha)olefin polymers.

41. The method of any one of embodiments 31-40, further comprising also discharging particulates from the reactor at a lower discharge point located below the upper discharge point.

42. The method of any one of embodiments 31-41, wherein the particulates are discharged from the upper and lower discharge points in a discharge cycle, wherein the particulates are discharged from the upper discharge point before the particulates are discharged from the lower discharge point during the discharge cycle.

43. The method of any one of embodiments 31-42, wherein a discharge apparatus at the upper discharge point also functions as a pressure tap during the discharging at the lower discharge point.

44. The method of any one of embodiments 31-43, with the proviso that no particulate separation mechanism is present in a cycle gas stream coupled to the reactor.

45. The method of any one of embodiments 31-44, further comprising adding the discharged particulates to the reactor at a point below the upper discharge point.

46. A system comprising:
a reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
a control system for measuring a concentration of particulates in the upper section of the reactor to obtain a first determined level of particulates in the upper section, and discharging at least some of the particulates from the reactor at an upper discharge point located above 0.55H as measured vertically from the distributor plate based on the first determined level.

47. A system comprising:
a reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
a control system for discharging at least some of the particulates from the reactor at an upper discharge point located above 0.55H as measured vertically from the distributor plate, and discharging particulates from the reactor at a lower discharge point located below the upper discharge point,
wherein the particulates are discharged from the upper and lower discharge points in a discharge cycle, wherein the particulates are discharged from the upper discharge point before the particulates are discharged from the lower discharge point during the discharge cycle.

48. A system comprising:
a reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
a control system for discharging at least some of the particulates from the reactor at an upper discharge point located above 0.55H as measured vertically from the distributor plate, and discharging particulates from the reactor at a lower discharge point located below the upper discharge point,
with the proviso that no particulate separation mechanism is present in a cycle gas stream coupled to the reactor.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method comprising:
operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;
measuring a concentration of particulates in the upper section of the reactor to obtain a first determined level of particulates in the upper section; and
discharging at least some of the particulates from the reactor at an upper discharge point located above 0.55H as measured vertically from the distributor plate based on the first determined level, wherein at least some of the particulates are discharged from the expanded section.

2. The method of claim 1, wherein the first determined level is determined using one of a pressure differential between the upper section and at least one of the expanded section and the bed section, a pressure differential between two vertically spaced points in the upper section, a plot of the percent of fines versus a pressure in the upper section, or a static probe.

3. The method of claim 1, wherein at least some of the particulates are discharged from the reactor at a point above about 0.70H.

4. The method of claim 1, wherein the particulates include particles of polymers.

5. The method of claim 4, wherein the polymers are poly (alpha)olefin polymers.

6. The method of claim 1, further comprising also discharging particulates from the reactor at a lower discharge point located below the upper discharge point.

7. The method of claim 6, wherein the particulates are discharged from the upper and lower discharge points in a discharge cycle, wherein the particulates are discharged from the upper discharge point before the particulates are discharged from the lower discharge point during the discharge cycle.

8. The method of claim 6, wherein a discharge apparatus at the upper discharge point also functions as a pressure tap during the discharging at the lower discharge point.

9. The method of claim 1, with the proviso that no particulate separation mechanism is present in a cycle gas stream coupled to the reactor.

10. The method of claim 1, further comprising adding the discharged particulates to the reactor at a point below the upper discharge point.

11. The method of claim 1, wherein the method is a method for polymerizing polyolefin polymers and the method further comprises contacting at least one catalyst with one or more monomers under polymerizable conditions to produce polyolefin polymers.

12. A method comprising:
operating a reactor or providing a reactor after operation, wherein the reactor comprises a bottom section, a bed section above the bottom section, a distributor plate between the bottom section and the bed section, an expanded section above the bed section, and an upper section above the bed section, wherein the bed section has a height H measured from the distributor plate to the expanded section;

discharging at least some of the particulates from the reactor at an upper discharge point located above 0.55H as measured vertically from the distributor plate; and discharging particulates from the reactor at a lower discharge point located below the upper discharge point, wherein the particulates are discharged from the upper and lower discharge points in a discharge cycle, wherein the particulates are discharged from the upper discharge point before the particulates are discharged from the lower discharge point during the discharge cycle; and wherein at least some of the particulates are discharged from the expanded section.

13. The method of claim 12, wherein at least some of the particulates are discharged from the reactor at a point above about 0.70H.

14. The method of claim 12, wherein the particulates include particles of polymers.

15. The method of claim 14, wherein the polymers are poly(alpha)olefin polymers.

16. The method of claim 12, with the proviso that no particulate separation mechanism is present in a cycle gas stream coupled to the reactor.

17. The method of claim 12, further comprising adding the discharged particulates to the reactor at a point below the upper discharge point.

* * * * *